United States Patent [19]

Seki et al.

[11] Patent Number: 5,331,647
[45] Date of Patent: Jul. 19, 1994

[54] COMMUNICATION APPARATUS HAVING FUNCTION TO RECORD COMMUNICATION HISTORY

[75] Inventors: Toshibumi Seki, Odawara; Yasukuni Okataku; Shinsuke Tamura, both of Yokohama, all of Japan

[73] Assignee: Kabushiki Kaisha Toshiba, Kawasaki, Japan

[21] Appl. No.: 556,188

[22] Filed: Jul. 23, 1990

[30] Foreign Application Priority Data

Jul. 26, 1989 [JP] Japan .................. 1-193598

[51] Int. Cl.[5] .............. G06F 11/10; H03M 13/00
[52] U.S. Cl. .................................... 371/53
[58] Field of Search ............ 371/53, 30, 8.2, 11.2, 371/13, 17

[56] References Cited

U.S. PATENT DOCUMENTS 4,868,824  9/1989  Golden ............................ 371/53

FOREIGN PATENT DOCUMENTS 0083429  5/1984  Japan ............................ 371/53
2-143741  6/1990  Japan .

OTHER PUBLICATIONS

"Cluster Control Protocol For Highly Reliable Broadcast Communication", Proc. of the IFIP Working Conf. on Distributed Processing; M. Takizawa; 1988.

"Reliable Broadcast Protocols", ACM TOCS, vol. 2, No. 3; J. Chang, N. F. Maxemchuk; Aug., 1984.

*Primary Examiner*—Robert W. Beausoliel, Jr.
*Assistant Examiner*—Glenn Snyder
*Attorney, Agent, or Firm*—Banner, Birch, McKie & Beckett

[57] ABSTRACT

A communication system comprising a communication path through which a message passes and, a plurality of communication apparatus, each apparatus includes a message transmission function to the communication path, and a read function for reading the message from the communication path. Each communication apparatus has a communication cumulative amount table so as to store the communication cumulative amount of messages transmitted by each communication apparatus as communication history data. The communication apparatus adds the latest communication cumulative amount in the communication cumulative amount table to a message which is transmitted to the communication path. The communication apparatus compares the stored communication cumulative amount table with the received communication cumulative amount. Thus, troubles of the communication subjects in the communication apparatus according to the result of the comparison can be detected. In addition, without complicated operations of each communication apparatus, while the overhead of processes is kept low, it is possible to prevent a bad effect due to a trouble or error of communication apparatus from being propagated to other communication apparatus.

7 Claims, 4 Drawing Sheets

FIG. 3

| TOTAL SECTION | COMMUNICATION CUMULATIVE AMOUNT INDIVIDUAL SECTION ||||||||
|---|---|---|---|---|---|---|---|---|
| | a | b | c | d | e | f | g | h |
| 1 | 1 | 0 | 0 | 0 | 0 | 0 | 0 | 0 |
| 2 | 1 | 0 | 0 | 0 | 1 | 0 | 0 | 0 |
| 3 | 1 | 0 | 0 | 0 | 1 | 0 | 0 | 1 |
| 4 | 2 | 0 | 0 | 0 | 1 | 0 | 0 | 1 |
| 5 | 2 | 1 | 0 | 0 | 1 | 0 | 0 | 1 |
| | | | | | | | | |

FIG. 4

| ADDRESS | SENDER ID | COMMUNICATION CUMULATIVE AMOUNT | MESSAGE MAIN TEXT |
|---|---|---|---|

COMMUNICATION APPARATUS HAVING FUNCTION TO RECORD COMMUNICATION HISTORY

FIELD OF THE INVENTION AND RELATED ART STATEMENT

The present invention relates to a communication apparatus for detecting a fault which occurred in a communication system and for preventing the fault from propagating over the system.

According to the variation of needs of computer systems in various fields and advancement of the technologies, the systems tend to get enlarged and complicated. Thus, the needs of distributed systems which process jobs through a plurality of communication apparatus are becoming strong. In a distributed processing system, a plurality of communication apparatus are connected by means of communication paths. Thus, if a fault which results in losing a message occurs due to a trouble of a communication apparatus, data which was processed according to erroneous information is propagated to other communication apparatus and thereby erroneous data is output as the entire system output. To prevent that, it is necessary to always monitor processes of each communication apparatus. If a trouble or an error is detected, it is necessary to stop the operation of the communication apparatus in which the trouble or the error occurred so as to prevent a bad effect which results from the trouble or the error from propagating to other communication apparatus.

To solve such a problem, thus far, for example, communication apparatus are multiplexed and received messages are compared to detect troubles and errors of the communication apparatus.

However, in such a method, the control of multiplexed communication apparatus becomes complicated and it is necessary to wait until a plurality of messages are received, thereby decreasing the process speed of the entire system.

The inventors of the present invention and the concerned persons proposed "Trouble and/or error detection method of communication subjects by adding communication cumulative amount to transmission messages and by comparing communication cumulative amount of reception messages with communication cumulative amount intrinsic to the communication subject" (Japanese Patent Application Sr. No. 63-297777).

In the aforementioned method, the disadvantage of the multiplex system is cleared and the overhead of process execution is reduced, in the communication system such as CSMA/CD system where data is retransmitted when a collision is detected. However, if transmission requests of Message A and Message B occur at the same time in different communication apparatus, although Message A is transmitted after Message B is received, Message A with communication cumulative amount, which does not account the arrival of Message B, is transmitted. Thus, even if data is correctly communicated, an inconsistency of communication cumulative amount takes place and the receiving communication apparatus supposes that a trouble occurred in the transmitting communication apparatus.

Thus, as a communication apparatus which allows an overhead of execution processes and halt time due to a trouble to be as small as possible, it is necessary to remove the inconsistency of communication cumulative amount even if a message is retransmitted due to an occurrence of collision.

SUMMARY OF THE INVENTION

An object of the present invention is to solve the aforementioned problems, namely, to reduce the overhead of processes of a communication apparatus so as to use it in a real time control and the like and to prevent a bad effect due to a trouble or an error of a communication apparatus from propagating to other ones.

The communication apparatus of the present invention has means for storing communication cumulative values each representing the amount of messages transmitted by a message transmitting means associated with communication apparatus and each of said plurality of the other communication apparatus. When the communication apparatus receives a message transmitted by other communication apparatus, the communication apparatus compares cumulative values included in the message to cumulative values stored in the storing means. If the comparison is negative, the communication apparatus executes an error process. So, it is possible to reduce the overhead of processes of a communication apparatus so as to use it in a real time control and the like and to prevent a bad effect due to a trouble or an error of a communication apparatus from propagating to other ones.

BRIEF DESCRIPTION OF DRAWINGS

FIG. 3 is a structural diagram showing the structure of a communication cumulative table of the embodiment of the present invention;

FIG. 4 is a diagram showing an example of a message of the embodiment of the present invention;

DETAILED DESCRIPTION OF PREFERRED EMBODIMENT

By referring to the accompanying drawings, an embodiment of the present invention will be described in the following.

Figure 1:
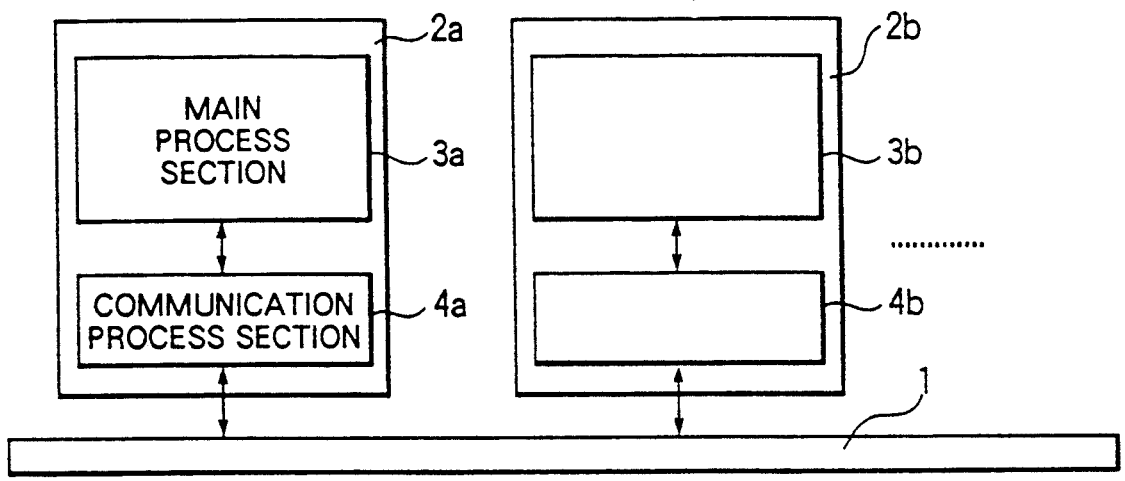
FIG. 1 is a structural diagram showing the structure of an embodiment of the present invention.

FIG. 1 is a structural diagram showing the structure of a communication apparatus of an embodiment of the present invention.

As shown in the figure, the communication apparatus comprises a communication path 1 and a plurality of communication apparatus 2a, 2b, ... (hereinafter named the communication apparatus 2 as a general term) which are connected to the former. Each communication apparatus 2 comprises main process section 3a, 3b... (hereinafter named the main process section 3 as a general term) and communication process section 4a, 4b, ... (hereinafter named the communication process section 4 as a general term) for executing information exchange between the communication apparatus 2 connected to the communication path 1. In other words, the communication apparatus 2 sends a message to the communication path 1 and receives a message from the communication path 1 so as to execute the information exchange with another communication apparatus 2 through the communication process section 4.

Figure 2:
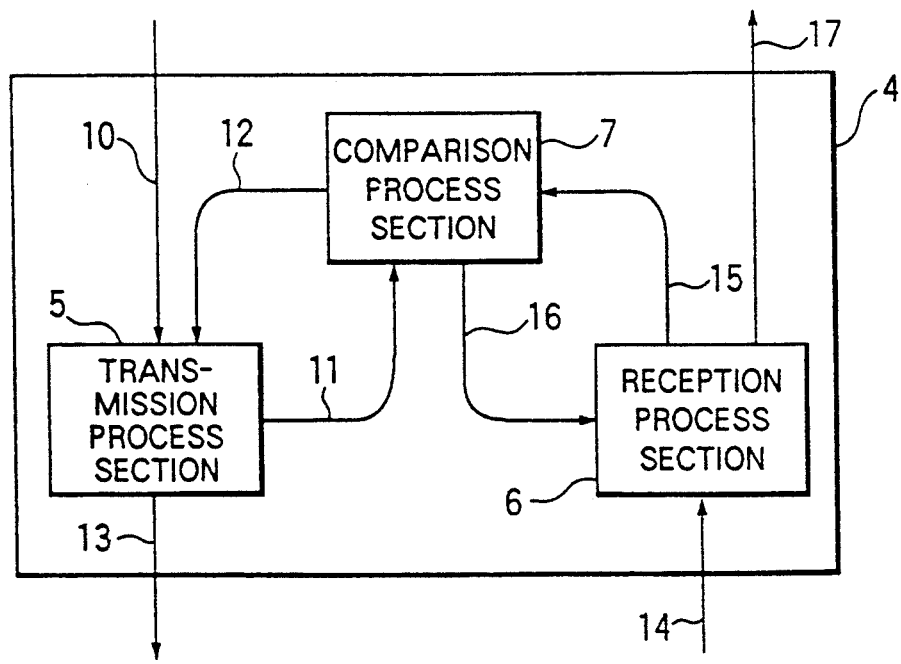
FIG. 2 is a structural diagram showing the structure of a communication process section of FIG. 1.

FIG. 2 shows the structure of the communication process section 4.

As shown in the figure, the communication process section 4 comprises a transmission process section 5, a reception process section 6 and a comparison process section 7. The transmission process section 5 is associated with the comparison process section 7 so as to execute a transmission process of a message which is transferred from the main process section 3. On the other hand, the reception process section 6 is associated with the comparison process section 7 so as to execute a reception process of a message from the communication path 1.

As shown in FIG. 3, the comparison process section 7 stores the number of messages which are passed through the communication path 1 as a communication cumulative amount table in order to represent the communication history thus far. The communication cumulative amount is composed of an individual communication cumulative amount section 8 where each communication apparatus 2 stores the communication cumulative amount for each of other communication apparatus which are senders of receipt messages and a total communication cumulative amount section 9 which represents the communication cumulative amount of the entire system, namely, the total value of the individual communication cumulative amount section 8. The number of columns that the individual communication cumulative amount section 8 requires is the number of the communication apparatus 2 connected to the communication path 1. In the example shown in FIG. 3, eight communication apparatus 2 designated a to h are connected. When a message is received or transmitted, one line of the communication record is newly added to the communication cumulative amount table and the communication cumulative amount table is updated. Thus, the line of the maximum value of the total communication cumulative amount section 9 represents the latest communication cumulative amount.

In the embodiment, the communication cumulative amount is defined as the number of transmissions.

Figure 5:
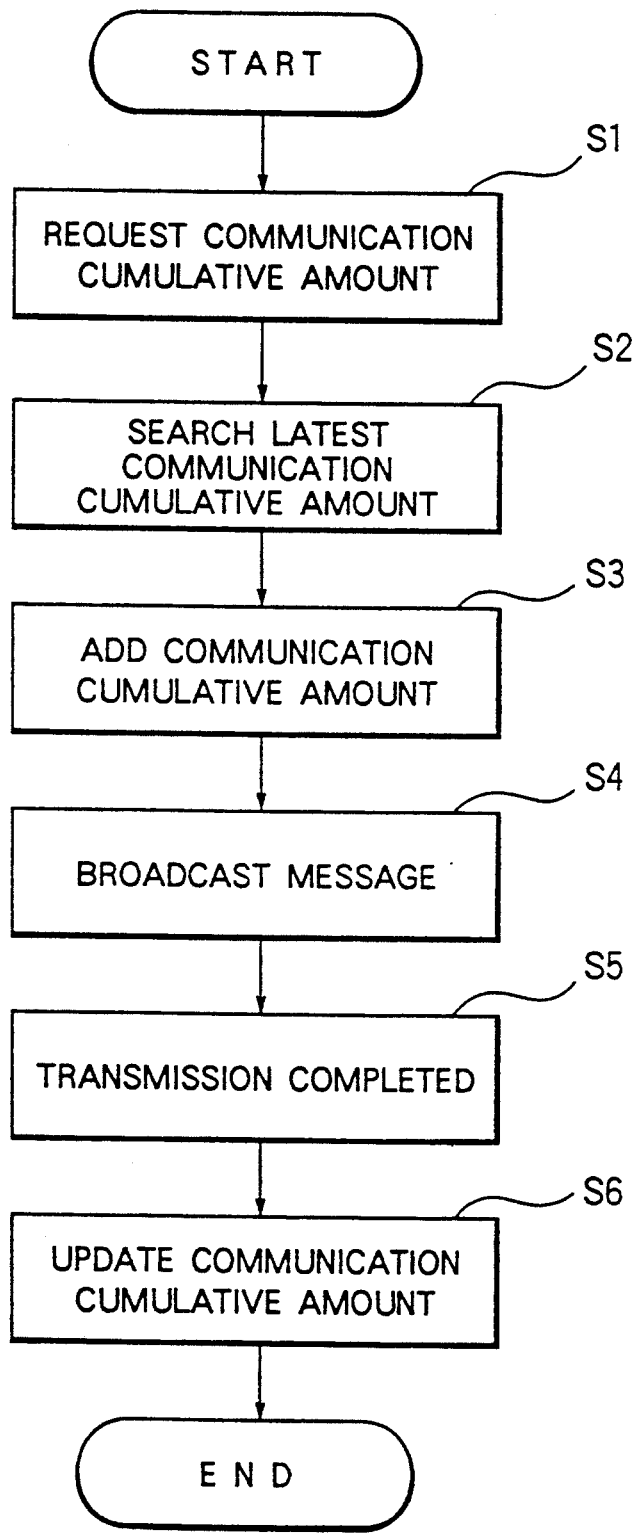
FIG. 5 is a flow chart showing a transmission process operation.
Figure 6:
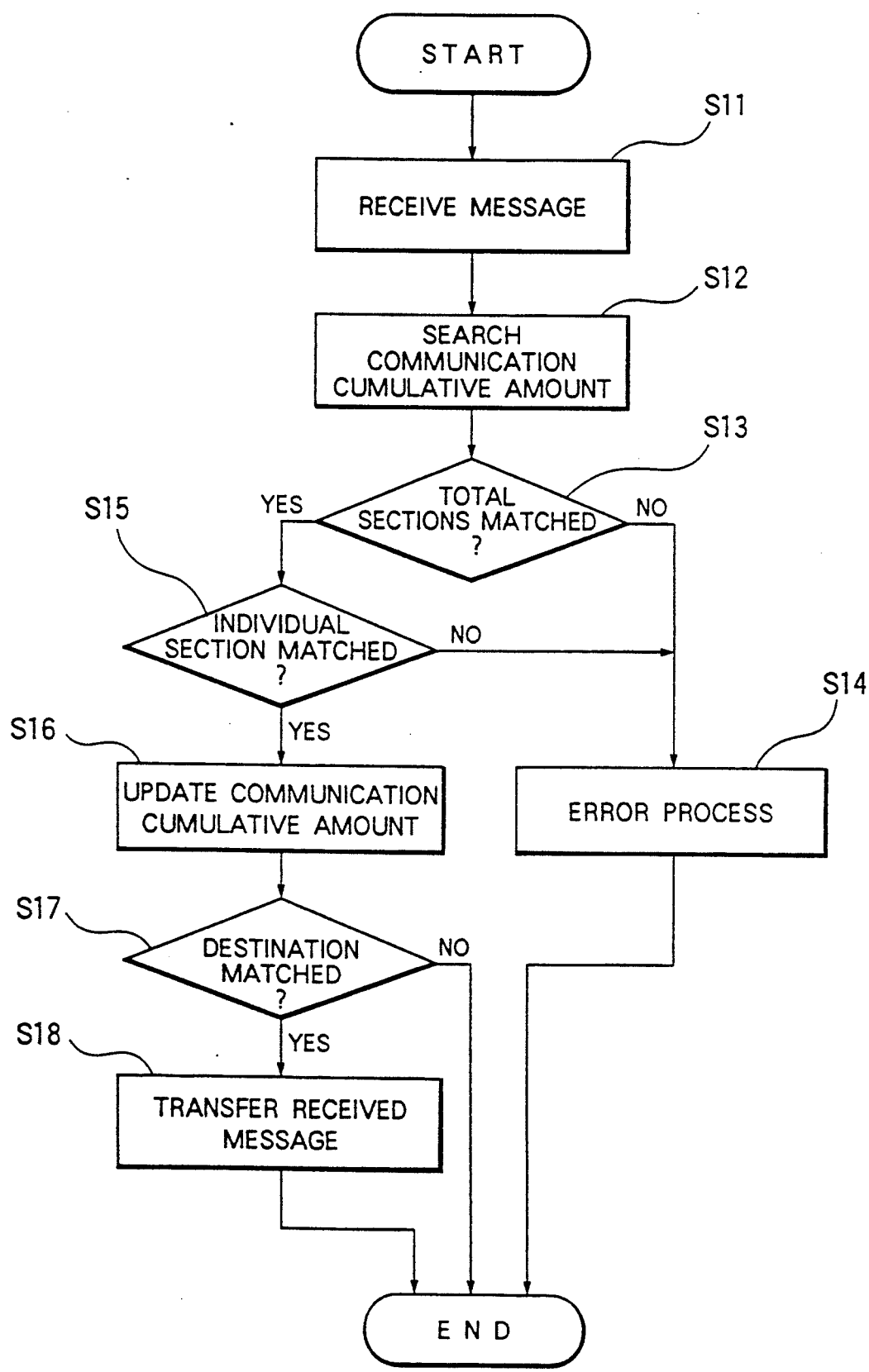
FIG. 6 is a flow chart showing a reception process operation.

Now, by referring to an example of message format shown in FIG. 4, a transmission flow chart shown in FIG. 5, and a reception flow chart shown in FIG. 6, operations of the embodiment of the present invention will be described in the following.

First of all, a transmission process which transmits a message from the main process section 3 to the communication path 1 will be described.

The transmission process section 5 receives a message which is transferred from the main process section 3 through a route 10. The transmission process section 5 also executes the following process in association with the comparison process section 7. Namely, the transmission process section 5 requests the comparison process section 7 to transfer a tab with the latest communication cumulative amount from the communication cumulative amount table through a route 11 (in step S1). When the comparison process section 7 receives this request, it picks up the tap representing the latest communication cumulative amount and sends it to the transmission process section 5 through a route 12 (in step S2). The transmission process section 5 adds the latest communication cumulative amount transferred from the comparison process section 7 to a message transferred from the main process section 3 (in step S3). In other words, as shown in FIG. 4, the transmission process section 5 generates a message in such a format that a destination ID, a sender ID of the transmission process section 5 in the communication apparatus 2 and the communication cumulative amount which has been received are added to a message main text, and broadcasts the message to the communication path 1 through a route 13 (in step S4).

After the transmission process section 5 normally completed the transmission of the message, it notifies the comparison process section 7 of the completion of the message transmission (in step S5). When the comparison process section 7 received the notification of the completion of the message transmission, it newly adds one tab whose individual communication cumulative amount sections 8 corresponding to itself and the total communication cumulative amount section 9 are greater than those of the latest communication cumulative amount just by 1, so as to record the state of the completion of transmission on the communication cumulative amount table (in step S6).

Now, a reception process where the communication apparatus 2 receives a message from the communication path 1 will be described in the following.

A message from the communication path 1 is received by the reception process section 6 through a route 14 (in step S11). When the reception process section 6 received the message from the communication path 1, it transfers the received message to the comparison process section 7 through a route 15 so as to check whether or not the received message is correct.

When the comparison process section 7 received the message through the route 15, it searches the tab in the communication cumulative amount table which has the same communication cumulative amount as that of the received message (in step S12). If both communication apparatus which send and receive that message behave correctly, obviously the tab which has the same communication cumulative amount as that of the received message exists in the communication cumulative amount table of the message receiving communication apparatus. At that time since the communication cumulative amount is the number of communications, it is obvious that the tab which should be found exists just n tabs apart from the latest comulative amount, where n is the difference between the total communication cumulative amount section 9 of the latest communication cumulative amount and that of the received message. Thus, the tab to be compared can be immediately found. Comparison of communication cumulative amount is performed as follows.

As the first step, a comparison of values in the total communication cumulative amount sections 9 is made (in step S13). If they do not match, it is assumed that a communication error takes place in the communication apparatus 2 of the corresponding message sender, and an error process is executed (in step S14). Thus, the message main text is not transferred to the main process section 3. Instead, a trouble notification of the communication apparatus 2 is transferred to the communication path 1 through the route 12. When the reception process section 6 receives the trouble notification from the predetermined number of communication apparatus within the predetermined period of time, the reception process section 6 determines that the trouble occurred in the communication apparatus 2 and then stops its operation. Moreover, if necessary, the reception process section 6 notifies the trouble of the communication apparatus 2 to the main process section 3 through routes 16 and 17.

On the other hand, when values in the total communication cumulative amount sections 9 are matched, the individual communication cumulative amount sections 8 are compared (in step S15). When they do not match, an error process similar to the aforementioned one is executed (in step S14). When the value of the total communication cumulative amount section 9 and that of the individual communication cumulative amount section 8 are matched, it is assumed that a correct message has been received and the state of reception completion is newly recorded on the communication cumulative amount table. Accordingly a tab, whose values of the individual communication cumulative amount section 8 corresponding to the message sender and the total communication cumulative amount section 9 are greater than those of the latest communication cumulative amount by just one is added to the communication cumulative amount table (in step S16). In addition, it is determined whether or not the destination of the message is the communication apparatus 2 to which the comparison process section 7 belongs (in step S17). When the destination is the communication apparatus 2 to which the comparison process section 7 belongs, the notification of the normal reception is made through the route 16 and the message main text is transferred from the reception process section 6 to the main process section 3 through the route 17 (in step S18). When the destination is not the communication apparatus 2 to which the comparison process section 7 belongs, the message main text is not transferred to the main process section 3.

Now, the case that a communication request is issued from both the communication apparatus 2a and 2b at the nearly same time will be described in the following. As shown in FIG. 3, assuming that the latest communication cumulative amount in the communication cumulative amount table has values "3" and "10001001" as the total communication cumulative amount section 9 and the individual communication cumulative amount section 8 respectively, and the communication cumulative amount is added to the messages from the communication apparatus 2a and 2b and the resultant messages are broadcast to the communication path 1. It is assumed that the communication apparatus 2c will receive the message from the communication apparatus 2a, for example. When the communication apparatus 2c received the message from the communication apparatus 2a, it compares the communication cumulative amount table stored in the own comparison process section 7c with the received communication cumulative amount. Since there is a tab where values are matched both in the total communication cumulative amount section 9 and the individual communication cumulative amount section 8, a tab where the value of the total communication cumulative amount section 9 and the value of the individual communication cumulative amount section 8 are "4" and "20001001", respectively, is added, and the communication cumulative amount table is updated to record the state where the message has been completely received. The added communication cumulative amount becomes the latest communication cumulative amount.

After that, the message from the communication apparatus 2b is received by the communication apparatus 2c. Although the communication cumulative amount included in the message is not matched with the latest communication cumulative amount which has been added in the communication apparatus 2c, since the communication cumulative amount preceding the latest communication cumulative amount is stored as history data, it is assumed that the message is correct and the message is received by the communication apparatus 2c. Then the line whose total communication cumulative amount section 9 and the individual communication cumulative amount section 8 are "5" and "21001001", respectively is added.

As was described above, since the communication cumulative amount is divided into the total section and the individual section and they are stored in a table format as history data, even if transmission requests are issued from a plurality of sites at the same time, no inconsistency of the communication cumulative amount takes place. Thus, the communication cumulative amount inconsistency which results from simultaneous transmissions from the plurality of sites can be prevented. And, messages which are transmitted simultaneously from the plurality of sites can be received.

Thus, in accordance with the communication apparatus of the present invention, since the communication cumulative amount is stored in a table format as history data, a communication error caused by a communication subject which fails to read a message and the resultant faulty propagation can be prevented without multiplexing the communication apparatus. Moreover, since it is not necessary to multiplex the communication apparatus, complication due to multiplication of processes of individual communication apparatus can be prevented. Furthermore, decrease of process speed necessary for waiting until messages are received from all multiplexed communication apparatus can be prevented.

The present invention is not limited to the aforementioned embodiment.

For example, in the aforementioned embodiment, the number of transmissions was used for the communication cumulative amount. However, it is possible to use the message length, check sum value, and so forth.

What is claimed is:

1. A communication apparatus for communicating information over a communication path between at least one other communication apparatus, said communication apparatus comprising:

transmitting means for transmitting an information packet to said at least one other communication apparatus over said communication path, wherein said information packet comprises an address section indicating a destination of said information packet, a sender identification section indicating which communication apparatus transmitted said information packet, a communication cumulative amount tab, and a main message section;

receiving means for receiving an information packet transmitted from said at least one other communication apparatus over said communication path, wherein said information packet comprises an address section indicating a destination of said information packet, a sender identification section indicating which communication apparatus transmitted said information packet, a communication cumulative amount tab, and a main message section; and a comparison process means, said comparison process means including means for storing a communication cumulative table having a plurality of tabs, a tab being added to said table each time said transmitting means transmits a transmit information packet, wherein each tab comprises a communication cumulative amount individual section and a total section, said communication cumulative amount individual section having communication cumulative vales each representing a quantity of messages transmitted by each said communication apparatus, said total section having a total value representing a sum of said communication cumulative values, wherein said comparison process means has operational modes, the modes including:

(a) a transmission mode in which said comparison process means transfers a most recently added tab in said stored communication cumulative table to said transmitting means responsive to a communication cumulative amount request from said transmitting means, in which said comparison process means confirms whether said most recently added tab is appended to a message to be transmitted, and in which said comparison process means creates a new tab when transmission of said message is confirmed, a total value in the total section of the new tab and a value corresponding to said communication apparatus in the individual section being incremented, other values in the new tab being the same as the values in the most recently added tab; and (b) a reception mode in which said comparison process means extracts a sender identification section and a communication cumulative amount tab from a received information packet, in which said comparison process means confirms that a total value in the total section of said extracted communication cumulative amount tab matches the total value in the total section of a tab in the stored communication cumulative table, in which said comparison process means compares the communication cumulative values of the communication cumulative amount individual section of the tab whose total section includes the matched total value with the communication cumulative values of the communication cumulative amount individual section of the extracted communication cumulative amount tab, and in which said comparison process means creates a new tab when both the total section and communication cumulative amount individual section of the tab of the stored communication cumulative table coincide with the total section and communication cumulative amount individual section of the received communication cumulative amount tab, a total value in the total section of the new tab and a communication cumulative value of a communication apparatus corresponding to the sender identification section extracted from the received information packet in the individual section being incremented, other values in the new tab being the same as the values in the most recently added tab.

2. A communication apparatus according to claim 1, wherein said comparison process means executes an error process from said reception mode if said total section of said extracted communication cumulative amount tab does not coincide with a total section of a tab of the communication cumulative table or if said communication cumulative amount individual section of said extracted communication cumulative amount tab does not coincide with the communication cumulative amount individual section of the tab in the stored communication cumulative table whose total section has the matched total value.

3. A communication device for use in a communication system having at least one other communication device which transmits and receives messages over a communication path, each message including a message text portion, an identification number identifying the communication device which transmitted the message, and a transmission record containing respective cumulative numbers of message transmissions of each communication device in said communication system and a total number of message transmissions equal to a sum of the respective cumulative number of message transmissions, said communication device comprising:

a memory for storing a table having a plurality of transmission records defining a history of message transmissions, each transmission record containing (1) respective cumulative numbers of message transmissions by each communication device in said communication system and (2) a total number of message transmissions equal to a sum of the respective cumulative numbers of message transmissions, wherein a most recent transmission record of said table has a total number of message transmissions greater than a total number of message transmissions of any other transmission record;

reading and writing means for reading transmission records from and writing transmission records to said table;

a transmitter section for transmitting a message to another communication device over said communication path, said transmitter section including:

means for causing said reading and writing means to read the most recent transmission record from said table;

means for combining a message text portion and an identification number identifying said communication device with said most recent transmission record to form the message; and means for causing said reading and writing means to write a new additional transmission record to said table when the message is transmitted over said communication path, the new additional transmission record formed by incrementing (1) the cumulative number of message transmissions int he most recent transmission record by said communication device and (2 l) the total number of message transmissions in the most recent transmission record;

a receiver section for receiving a message from another communication device, said receiver section comprising:

detecting means for detecting the message text portion, the identification number identifying the other communication device, and the transmission record contained in the received message;

comparing means for comparing the detected transmission record with the transmission records in said table;

means responsive to said comparing means for causing said reading and writing means to write a new additional transmission record to said table if the detected transmission record is the same as a transmission record in aid table, the new additional transmission record formed by incrementing (1) the cumulative number of message transmissions in the most recent transmission record by the other communication device in accordance with the detected identification number and (2) the total number of message transmission in the most recent transmission record.

4. The communication device according to claim 3, wherein said comparing means comprises:
first means for comparing the total number of message transmissions in the received transmission record with the total number of message transmissions in each transmission record in said table; and
second means for comparing the respective cumulative numbers of message transmissions by each communication device in the received message transmission with the respective cumulative numbers of message transmissions by each communication device in the transmission record in said table having the same total number of message transmissions as the total number of message transmissions the received transmission record.

5. The communication device according to claim 3, wherein said messages further include address information or addressing messages to other communication devices in said communication system.

6. The communication device according to claim 3, further comprising:
fault detecting means responsive to said comparing means for detecting a message fault if the received transmission record is not the same as a transmission record in said table.

7. A receiver for use in combination with transmitters which transmit messages each including a message text portion, a transmitter identification number, and transmission record containing respective cumulative numbers of message transmissions by said transmitters and a total number of message transmissions equal to a sum of the respective cumulative number of message transmissions, said receive comprising:
a memory for storing a table having a plurality of transmission records defining a history of message transmissions, each transmission record containing (1) respective cumulative numbers of message transmission by said transmitters and (2) a total number of message transmissions equal to a sum of the respective cumulative numbers of message transmission, wherein a most recent transmission record of said table has a total number of message transmissions greater than a total number of message transmissions of any other transmission record;
reading and writing means for reading transmission records from and writing transmission records to said table;
detecting means for detecting the message text portion, the transmitter identification number, and the transmission record in a received message;
comparing means for comparing the received transmission record with the transmission records in said table;
means responsive to said comparing means for causing said reading and writing means to write a new additional transmission record to said table if the received transmission record is the same as a transmission record in said table, the new additional transmission record formed by incrementing (1) the cumulative number of message transmissions in the most recent transmission record by the transmitter corresponding to the detected transmitter identification number and (2) the total number of message transmissions of the most recent transmission record.

* * * * *